United States Patent
Goodarzi et al.

(10) Patent No.: US 11,891,038 B2
(45) Date of Patent: Feb. 6, 2024

(54) VEHICLE-BASED ALGORITHM FOR FINDING THE TRAILER BRAKE OPTIMUM GAIN

(71) Applicant: GM GLOBAL TECHNOLOGY OPERATIONS LLC, Detroit, MI (US)

(72) Inventors: Avesta Goodarzi, Whitby (CA); Hasan Alper Hepguvendik, Toronto (CA); Patrick G. DiGioacchino, Niagara Falls (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 509 days.

(21) Appl. No.: 17/332,432

(22) Filed: May 27, 2021

(65) Prior Publication Data

US 2022/0379853 A1    Dec. 1, 2022

(51) Int. Cl.
| | | |
|---|---|---|
| *B60T 8/17* | (2006.01) | |
| *B60T 8/171* | (2006.01) | |
| *B60T 8/32* | (2006.01) | |
| *B60T 7/20* | (2006.01) | |
| *B60T 8/172* | (2006.01) | |

(52) U.S. Cl.
CPC ............ *B60T 8/1708* (2013.01); *B60T 7/20* (2013.01); *B60T 8/171* (2013.01); *B60T 8/172* (2013.01); *B60T 8/323* (2013.01); *B60T 2250/04* (2013.01)

(58) Field of Classification Search
CPC ........ B60T 8/1708; B60T 8/171; B60T 8/172; B60T 8/323; B60T 7/20; B60T 2250/04; B60T 13/662
See application file for complete search history.

(56) References Cited

U.S. PATENT DOCUMENTS

| | | | | |
|---|---|---|---|---|
| 5,333,948 | A * | 8/1994 | Austin | B60T 13/74 188/DIG. 1 |
| 10,363,910 | B2 * | 7/2019 | Kulkarni | H01M 8/106 |
| 11,225,235 | B2 * | 1/2022 | DiGioacchino | B60T 8/1708 |
| 2007/0001509 | A1 * | 1/2007 | Brown | B60T 8/1708 303/123 |
| 2015/0353063 | A1 * | 12/2015 | Tuhro | B60T 8/1708 701/70 |

OTHER PUBLICATIONS

Australian Patent No. AU 2015101456 to Pasfield published on Nov. 12, 2015.*
Canadian Patent No. CA 3055370 to Henriksson published on Sep. 13, 2018.*

* cited by examiner

*Primary Examiner* — Pamela Rodriguez
(74) *Attorney, Agent, or Firm* — Vivacqua Crane PLLC

(57) ABSTRACT

A method for finding an optimum trailer gain, comprising: applying trailer brake pulses to a trailer while a vehicle is coasting using a trailer brake of a trailer, wherein the trailer is coupled to the vehicle; monitoring an average deceleration of the vehicle and the trailer brake gain of the trailer brake pulses applied to the trailer while the vehicle is coasting; generating a graph of the average deceleration of the vehicle versus the trailer brake gain, wherein the graph includes a curve that illustrates a relationship between the average deceleration of the vehicle and the trailer brake gain of the trailer brake pulses applied to the trailer while the vehicle is coasting; and finding a bend point of the curve in the graph to determine an optimum trailer brake gain.

20 Claims, 4 Drawing Sheets

VEHICLE-BASED ALGORITHM FOR FINDING THE TRAILER BRAKE OPTIMUM GAIN

INTRODUCTION

The present disclosure relates to vehicle trailers and, more particularly, to vehicle-based algorithm for finding the trailer brake optimum gain.

Manual trailer gain settings may reduce the service life of the trailer tires and brakes. Also, manual trailer gain setting is not an easy task perform. Wireless sensors may also have connectivity and reliability issues. There is therefore a need for developing a method that uses solely vehicle data, without the need for additional hardware on the trailer, to find the trailer optimum gain in a fast and accurate manner.

SUMMARY

To this end, the present disclosure describes an algorithm for finding the trailer brake gain based solely on available vehicle data and without need for any type of measurement from the trailer side. During this method, the vehicle operator drives straight in a specified speed range and activates the vehicle-based automatic gain scaling system while the vehicle is coasting. The system applies two or more trailer brake pulses automatically and by analyzing the available vehicle data on CAN bus, the vehicle deceleration is able to precisely find the optimum trailer gain. The algorithm analyzes the vehicle deceleration during trailer gain setting, determines optimum averaging windows, cancels out the transient response effects, and calculates the optimized average decelerations. The algorithm also selects the optimized gain searching step-size during trailer gain setting to improve the gain search accuracy, minimizing the number of required trailer brake pulses and reducing the gain setting duration.

The present disclosure relates to a method for finding an optimum brake gain. In an aspect of the present disclosure, the method includes applying trailer brake pulses to a trailer while a vehicle is coasting, wherein the trailer is coupled to the vehicle, the trailer includes a trailer brake, each of the trailer brake pulses has an activation brake time and a trailer brake gain, trailer brake is commanded by a trailer brake controller to apply the trailer brake pulses, and the trailer brake gain is proportional to an amount of braking force applied to the trailer by the trailer brake, the trailer brake is commanded by a trailer brake controller to apply trailer brake pulses; monitoring an average deceleration of the vehicle and the trailer brake gain of the trailer brake pulses applied to the trailer while the vehicle is coasting; generating a graph of the average deceleration of the vehicle versus the trailer brake gain, wherein the graph includes a curve that illustrates a relationship between the average deceleration of the vehicle and the trailer brake gain of the trailer brake pulses applied to the trailer while the vehicle is coasting; and finding a bend point of the curve in the graph to determine an optimum trailer brake gain. The trailer brake pulses may be defined by several parameters, including total cycle time, releasing time, gap time, averaging window, waiting time, and brake activation time.

In an aspect of the present disclosure, finding a bend point of the curve includes determining a slope of each of the curve segments of the curve in the graph, wherein each of the curve segments is between two adjacent data points. The bend point is one of the curve segments in which the slope is less a predetermined threshold.

In an aspect of the present disclosure, the method further comprises determining a step size of the trailer brake pulses. The step size is the amount the gain increases from one pulse to the next pulse. The magnitude of the step size is a function of the deceleration.

In an aspect of the present disclosure, applying trailer brake pulses to the trailer while the vehicle is coasting includes increasing the trailer gain over time. During coasting, there is no braking or acceleration.

In an aspect of the present disclosure, the method further includes determining an averaging window for determining the average deceleration of the vehicle.

In an aspect of the present disclosure, the method further includes calculating the average deceleration of the vehicle in the averaging window.

In an aspect of the present disclosure, the method further includes storing the average deceleration of the vehicle and the trailer brake gain of the trailer brake pulses applied to the trailer while the vehicle is coasting on a non-transitory memory of the vehicle.

In an aspect of the present disclosure, the method further includes determining whether the data points of the graph are still in a dead zone. In the dead zone, the vehicle may decelerate but the value of the deceleration is not significant and does not change proportionally with increasing the trailer gain.

In an aspect of the present disclosure, finding the bend point of the curve in the graph to determine an optimum trailer brake gain occurs in response to determining that the data points are not in the dead zone.

In an aspect of the present disclosure, the vehicle includes a brake pedal and an acceleration pedal, and the vehicle is coasting when: 1) the vehicle is driven at, for example, 25 miles per hour or a predetermined speed range; 2) the vehicle is driven straight; 3) the brake pedal is not depressed; and 4) the acceleration pedal is not depressed.

The present disclosure also describes a vehicle system. In an aspect of the present disclosure, the vehicle system includes a vehicle including a controller and a trailer attached to the vehicle. The trailer includes a trailer brake. The controller is programmed to execute the method described above. The vehicle system also includes a human-machine interface (HMI), which may be a center stack screen or a drive information center. The HMI interacts with a user to show information and receives confirmation, activation, cancellation commands, etc. The vehicle system includes a trailer brake controller programmed to command the trailer brake to apply brake pulses.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses.

Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
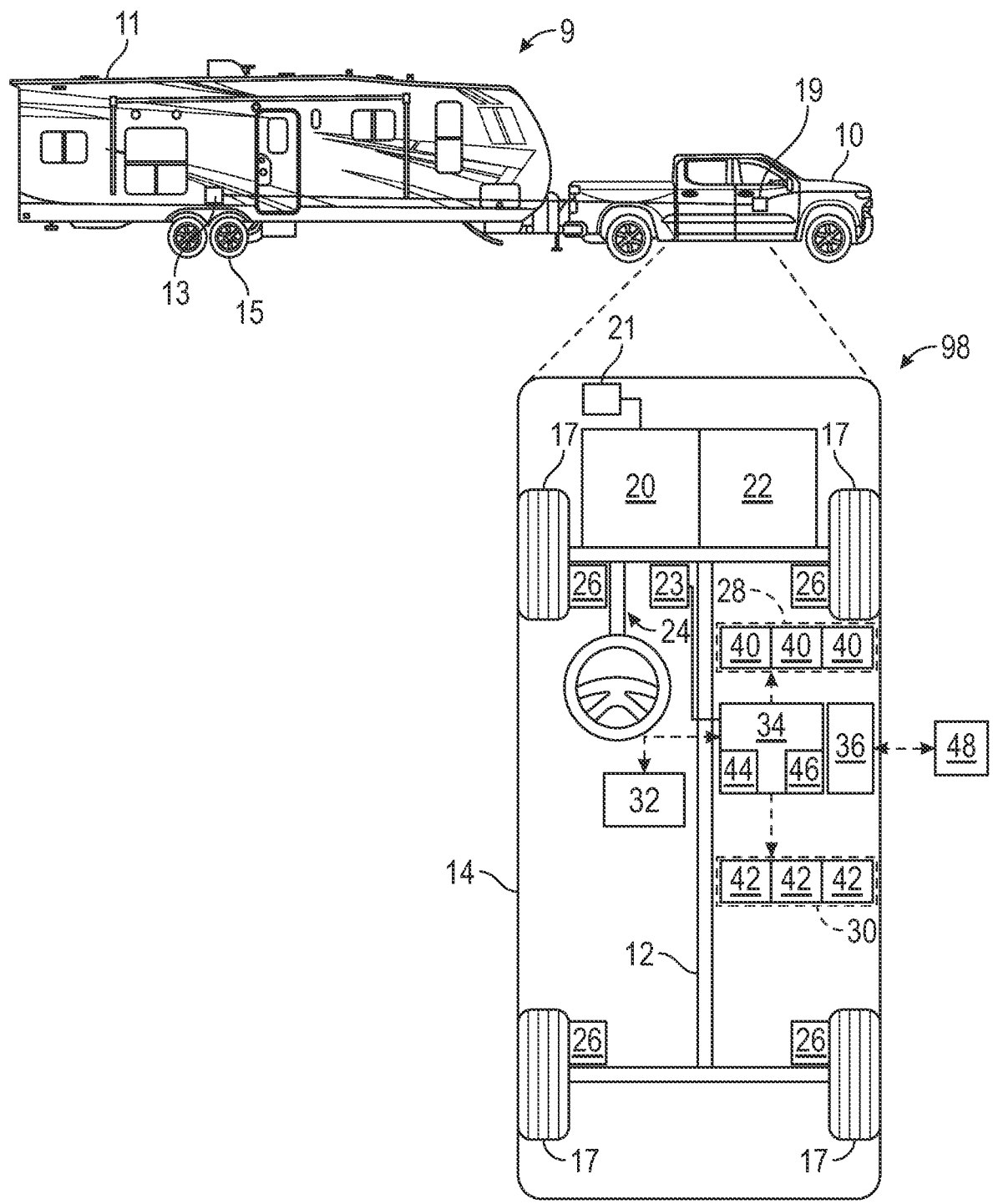
FIG. 1 is a schematic block diagram of a vehicle system including a vehicle and a trailer.

With reference to FIG. 1, the vehicle 10 generally includes a chassis 12, a body 14, front and rear wheels 17. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle and a control system 98 is incorporated into the vehicle 10. The control system 98 may be simply referred to as the system. The vehicle 10 is, for example, a vehicle that is automatically controlled to carry passengers from one location to another. The vehicle 10 is depicted in the illustrated embodiment as a pickup truck, but it should be appreciated that other vehicles including sport utility vehicles (SUVs), recreational vehicles (RVs), etc., can also be used.

The vehicle 10 is part of a vehicle system 9. The vehicle system 9 further includes a trailer 11 attached to the vehicle 10. The trailer 11 includes one or more trailer brakes 13 for applying an amount of braking force applied to the trailer 11 to decelerate the trailer 11. The trailer 11 may include trailer wheels 15. The trailer brake 13 in communication with a trailer brake controller 19. The trailer brake controller 19 controls the trailer brake 13 to apply braking torque to the trailer wheels 15. The trailer brake 13 may be electric or electric over hydraulic (EoH). The trailer brake 13 is commanded by the trailer brake controller 19 to apply trailer brake pulses to the trailer wheels 15.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery pack 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more ground penetrating radar (GPR) sensors, one or more global positioning systems (GPS) devices, one or more cameras (e.g., optical cameras and/or thermal cameras, such as a rear camera and/or a front camera), brake pedal position sensor, accelerator pedal position sensor, steering angle sensor, speed sensor, steering angle sensor, ultrasonic sensors, one or more inertial measurement units (IMUs) and/or other sensors. The IMU is configured to measure the vehicle deceleration of the vehicle 10.

The sensor system 28 includes one or more Global Positioning System (GPS) transceiver configured to detect and monitor the route data (i.e., route information). The GPS device is configured to communicate with a GPS to locate the position of the vehicle 10 in the globe. The GPS device is in electronic communication with the controller 34. Because the sensor system 28 provides data to the controller 34, the sensor system 28 and its sensors 40 are considered sources of information (or simply sources).

The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). For example, the actuator devices 42 include an accelerator pedal, a brake pedal, etc.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The controller 34 includes at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of other memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 is also in communication with the trailer brake 13 of the trailer 11.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a human-machine interface (HMI) 23, which may be a center stack screen or a drive information center. The HMI 23 interacts with a user to show information and receives confirmation, activation, cancellation commands, etc. The HMI 23 may be configured as an alarm, such as a speaker to provide a sound, a haptic feedback in a vehicle seat or other object, a visual display, or other device suitable to provide a notification to the vehicle operator of the vehicle 10. The HMI 23 is in electronic communication with the controller 34 and is configured to receive inputs by a user (e.g., vehicle operator). Accordingly, the controller 34 is configured to receive inputs from the user via the HMI 23. The HMI 23 includes a display configured to display information to the user (e.g., vehicle operator or passenger) and may include one or more speakers to provide an auditable notification to the vehicle operator.

Figure 2:
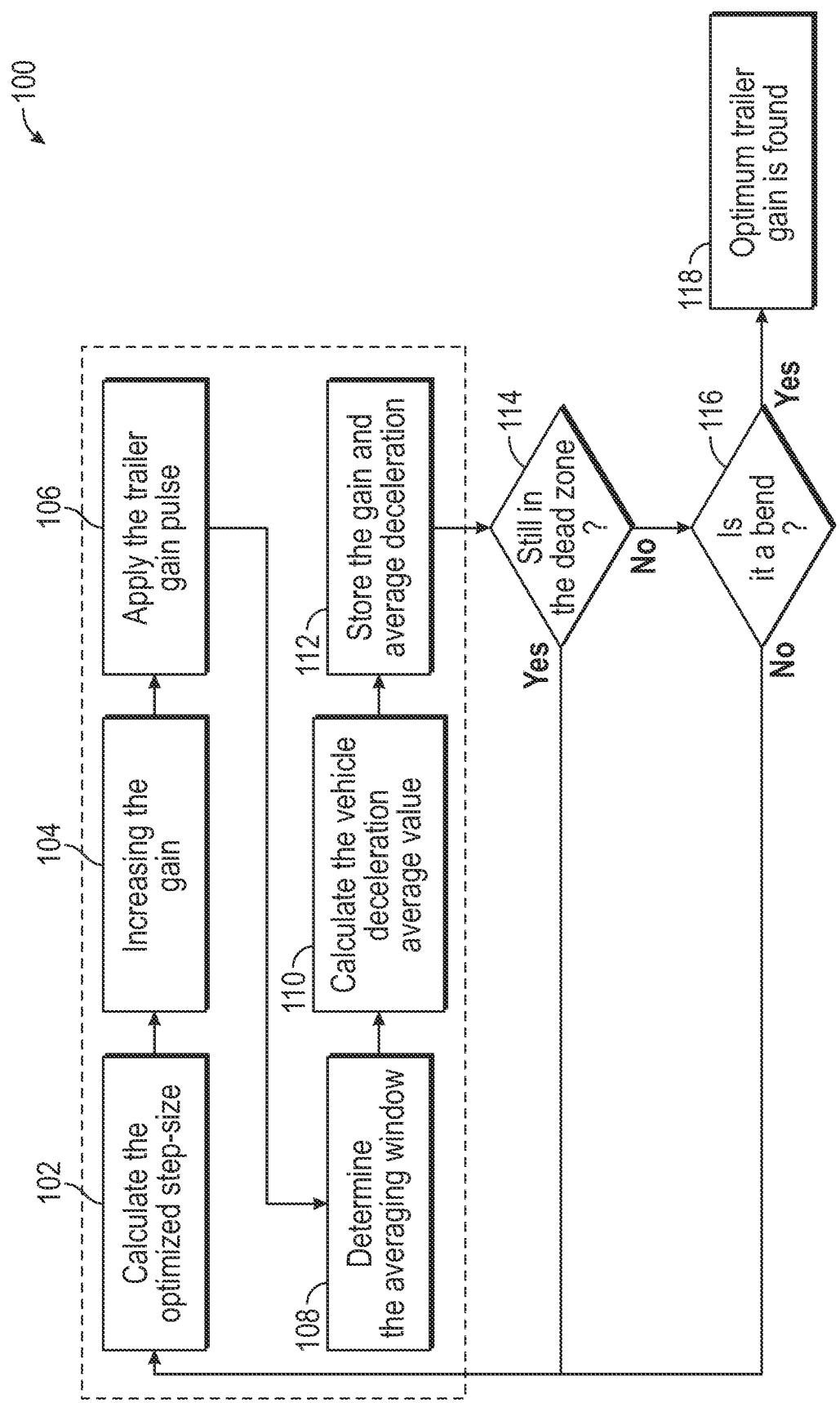
FIG. 2 is a flowchart of a method for finding an optimum trailer gain.

The communication system 36 is in communication with the controller 34 and is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system 36 is configured to wirelessly communicate information between the vehicle 10 and another vehicle. Further, the communication system 36 is configured to wirelessly communication information between the vehicle 10 and infrastructure, such as a parking meter. Accordingly, the vehicle 10 may use V2I communications to receive parking restriction information or data from an infrastructure, such as a parking meter.

FIG. 2 is a method 100 for finding an optimum trailer gain. The trailer brake controller 19 may execute the method 100. The method 100 begins at block 102 and occurs while the vehicle 10 is coasting. In the present disclosure, the vehicle 10 is coasting when: 1) the vehicle is driven at a predetermined speed range (e.g., between 25 miles per hour and 35 miles per hour); 2) the vehicle is driven straight; 3) the brake pedal is not depressed; and 4) the acceleration pedal is not depressed. At block 102, the controller 34 determines (e.g., calculates) the optimized step size to be used to apply trailer brake pulses to the trailer 11. In the present disclosure, the step size is the amount of the gain increases from one pulse to the next pulse and may be, for example, 0.5, 1, or gain units. The magnitude of the gain increase is a function of the deceleration. The optimized step size may be determined by testing the vehicle system 9 and/or the vehicle 10. The method 100 then proceeds to block 104.

At block 104, the trailer brake gain is increased. The trailer brake gain is proportional to an amount of braking force applied to the trailer 11 by the trailer brake 13. To increase the trailer brake gain, the controller 34 may command the trailer brake controller 19 to increase the amount of braking force applied to the trailer wheels 15 of the trailer 11. Then, the method 100 proceeds to block 106.

At block 106, the trailer brake pulses are applied to the trailer 11 while the vehicle 10 is coasting. To do so, the controller 34 may command the trailer brake 13 to apply braking toque (in pulses) to the trailer wheels 15 of the trailer 11. Each of the trailer brake pulses has an activation brake time and a trailer brake gain. As discussed above, the trailer brake gain is proportional to an amount of braking force applied to the trailer 11 by the trailer brake 13. The activation brake time is the amount of time that the trailer brake 13 will apply braking torque to the trailer wheels 15 during a single trailer brake pulse. trailer brake pulses may be applied to the trailer 11 as a step function. In the present disclosure, the vehicle 10 is coasting when: 1) the vehicle is driven, for example, at 25 miles per hour; 2) the vehicle is driven straight; 3) the brake pedal is not depressed; and 4) the acceleration pedal is not depressed. The method 100 then proceeds to block 108.

At block 108, the averaging window for determining the average deceleration of the vehicle 10 is determined. The averaging window is an amount of time. To determine this amount of time, testing may be performed on the vehicle system 9. Thus, the averaging window may be a predetermined value stored on the computer readable storage device or media 46. The processor 44 may therefore retrieve the averaging window value from the computer readable storage device or media 46. The method 100 then proceeds to block 110.

At block 110, the controller 34 calculates and monitors the vehicle deceleration average value while the vehicle 10 is coasting and the trailer brake pulses are applied to the trailer 11. The deceleration of the vehicle 10 may be determined using one or more sensors 40, such as an IMU. The deceleration of the vehicle 10 is then monitored through each averaging window (i.e., amount of time). Then, using the measured deceleration of the vehicle 10, the controller 34 determines (e.g., calculates) average vehicle deceleration average value in each averaging window. Then, the method 100 proceeds to block 112.

At block 112, the average deceleration of the vehicle 10 and the trailer brake gain of the trailer brake pulses applied to the trailer 11 while the vehicle 10 is coasting are stored on the computer readable storage device or media 46. Using the stored information, the controller 34 generates a graph 200 of the deceleration of the vehicle versus the trailer brake gain as shown in FIG. 3.

Figure 3:
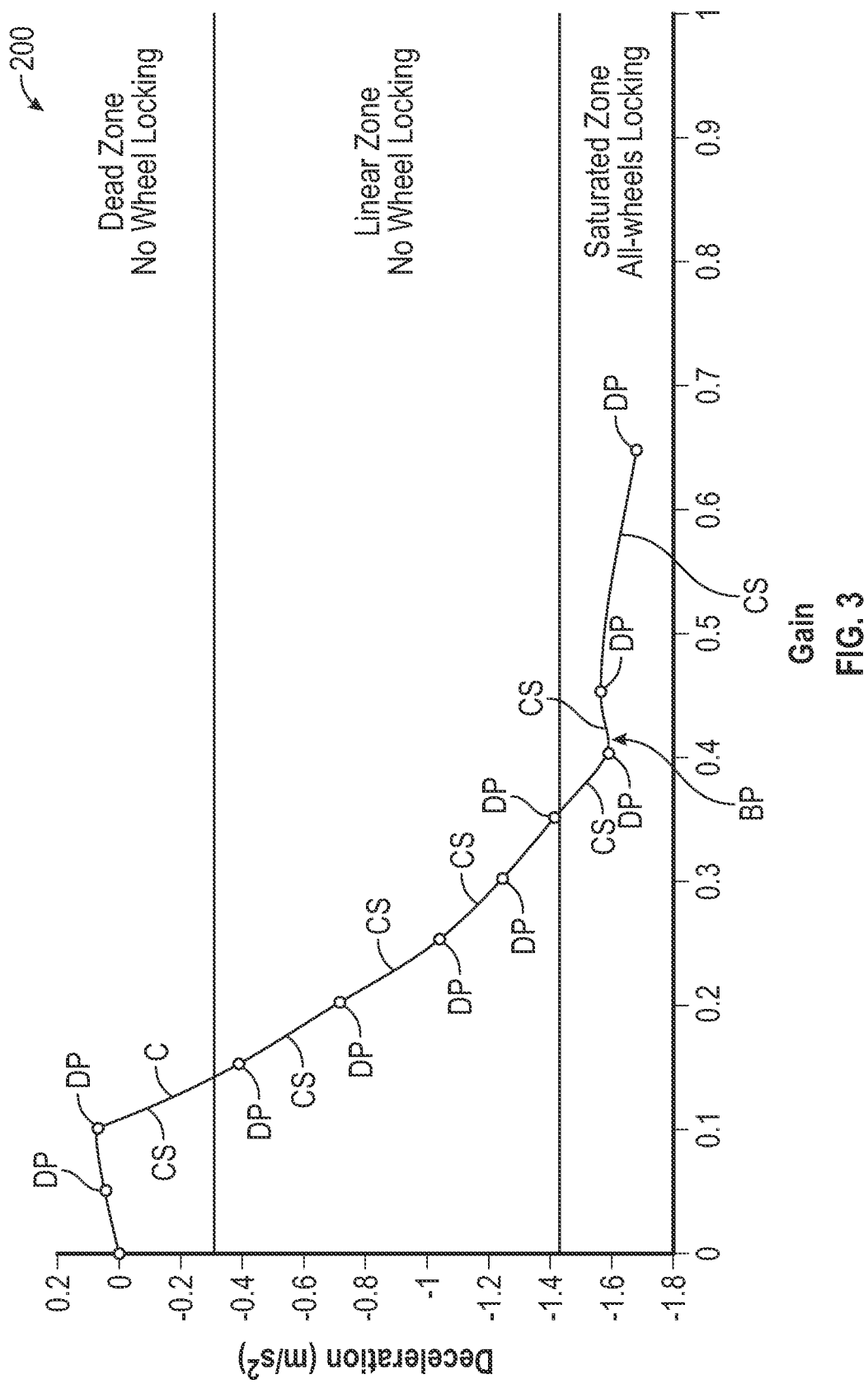
FIG. 3 is a graph of vehicle deceleration versus trailer brake gain.

With reference to FIG. 3, the graph 200 including a curve C that illustrates a relationship between the average deceleration of the vehicle 10 and the trailer brake gain of the trailer brake pulses applied to the trailer while the vehicle 10 is coasting. In this graph 200, the horizontal axis is the trailer gain applied to the trailer 11, and the vertical axis is the average deceleration of the vehicle 10. The graph 200 includes a plurality of data points DP, and the curve C follows the data points DP. The graph includes a dead zone, a linear zone, and a saturated zone. In the dead zone, the vehicle may decelerate but the value of the deceleration is not significant and does not change proportionally with increasing the trailer gain. In the dead zone, the trailer wheels 15 are not locked. To be out of the dead zone, the vehicle deceleration is greater than a predetermined value. The linear zone is a zone in which the vehicle 10 is linearly decelerating. In the linear zone, the trailer wheels 15 are not locked. The saturated zone is a zone in which the deceleration of the vehicle 10 is stabilizing. In the saturated zone, all the trailer wheels 15 are locked.

Figure 4:
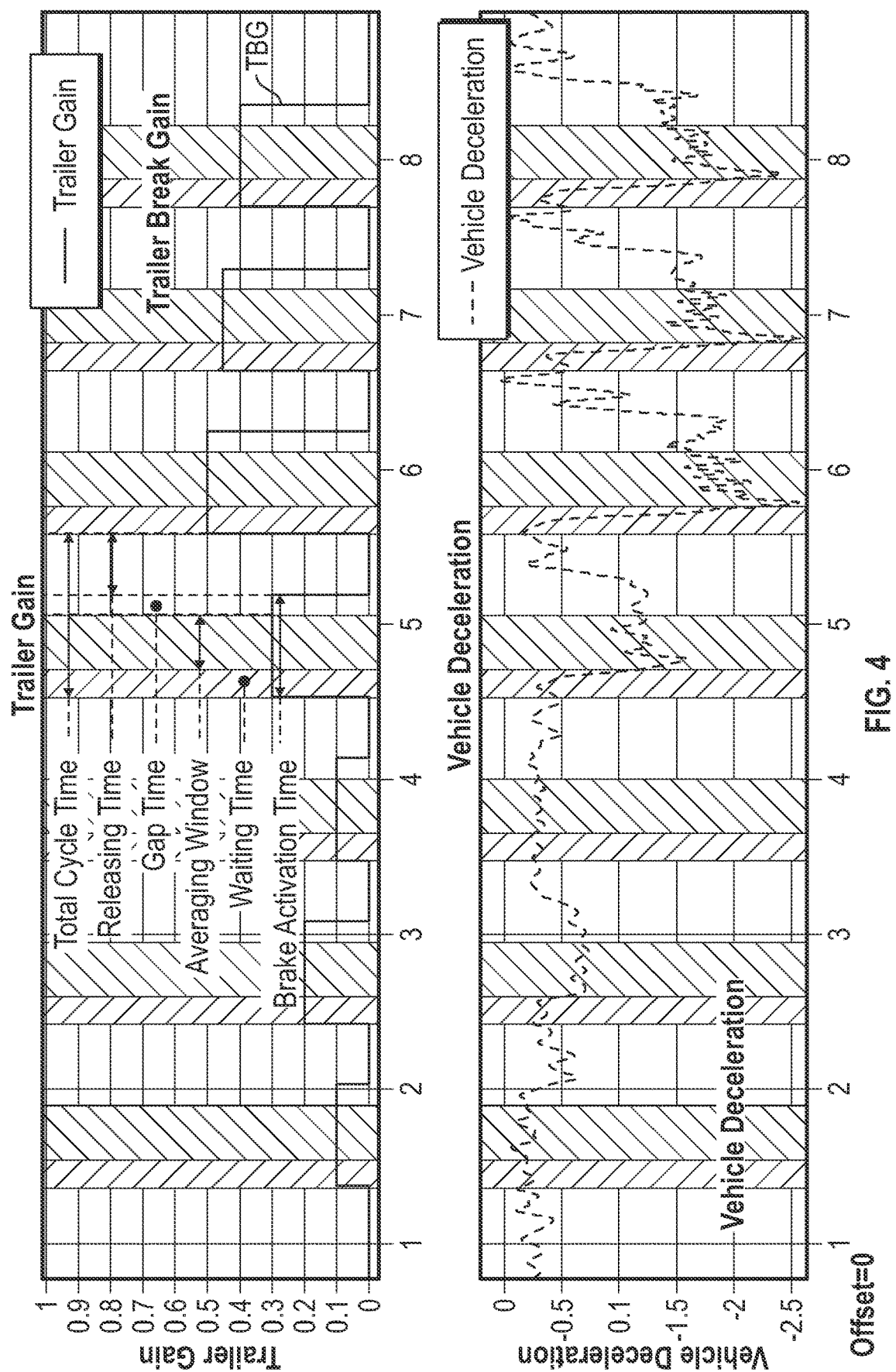
FIG. 4 is a graph showing trailer brake gain and vehicle deceleration versus time.

FIG. 4 is a graph showing the trailer brake gain TBG and the vehicle deceleration VD versus time. The trailer brake pulses may be defined by several parameters, such as total cycle time, releasing time, gap time, averaging window, waiting time, and brake activation time. While the graph of FIG. 4 shows these parameters have specific values, these values are merely examples. The parameters of the trailer brake pulses may have other values. FIG. 4 also shows the vehicle deceleration while the trailer brake pulses are being applied.

Returning to FIG. 2, after block 112, the method 100 proceeds to block 114. At block 114, the controller 34 determines whether the data points DP of the graph 200 (FIG. 3) are still in the dead zone. As discussed above, the dead zone is the zone of the graph 200 in which the vehicle 10 is not decelerating. In the dead zone, the trailer wheels 15 are not locked. If the data points DP of the graph 200 (FIG. 3) are still in the dead zone, then the method 100 returns to block 102. If the data points DP of the graph 200 are not in the dead zone, then the method 100 proceeds to block 116.

At block 116, the controller 34 determines whether there is a bend point BP (FIG. 3) in the curve C of the graph 200. To do so, the controller 34 determines a slope of each of the curve segments CS (FIG. 3) of the curve C in the graph 200. Each of the curve segments CS is between two adjacent data points DP. The controller 34 then determines that there is a bend point BP if the slope in one of the curve segments CS is less a predetermined threshold. If no bend point BP is found, then the method 100 returns to block 102. If the bend point BP is found, then the method 100 proceeds to block 118.

At block 118, the controller 34 determines the optimum trailer gain is the trailer gain in the graph 200 at the bend point BP. By doing so, the vehicle system 9 solely uses data from the vehicle 10 (e.g., deceleration) to quickly and accurately determine the optimum trailer gain without the need for additional hardware on the trailer 11.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for finding an optimum trailer brake gain, comprising:

applying trailer brake pulses to a trailer while a vehicle is coasting using a trailer brake of a trailer, wherein the trailer is coupled to the vehicle, each of the trailer brake pulses has an activation brake time and a trailer brake gain, the trailer brake is commanded by a trailer brake controller to apply the trailer brake pulses, the trailer brake pulses have a waiting time, and the trailer brake gain is proportional to an amount of braking force applied to the trailer by the trailer brake;

monitoring an average deceleration of the vehicle and the trailer brake gain of the trailer brake pulses applied to the trailer while the vehicle is coasting;

generating a graph of the average deceleration of the vehicle versus the trailer brake gain, wherein the graph includes a curve that illustrates a relationship between the average deceleration of the vehicle and the trailer brake gain of the trailer brake pulses applied to the trailer while the vehicle is coasting; and finding a bend point of the curve in the graph to determine the optimum trailer brake gain.

2. The method of claim 1, wherein the curve includes curve segments between two adjacent data points, and finding the bend point of the curve includes:

determining a slope of each of the curve segments of the curve in the graph; and wherein the bend point is one of the curve segments in which the slope is less a predetermined threshold.

3. The method of claim 1, further comprises determining a step size of the trailer brake pulses, wherein the step size is an amount of gain increase from one pulse to a next pulse.

4. The method of claim 2, wherein applying the trailer brake pulses to the trailer while the vehicle is coasting includes increasing the trailer brake gain over time.

5. The method of claim 4, further comprising determining an averaging window for determining the average deceleration of the vehicle.

6. The method of claim 5, further comprising calculating the average deceleration of the vehicle in the averaging window.

7. The method of claim 6, storing the average deceleration of the vehicle and the trailer brake gain of the trailer brake pulses applied to the trailer while the vehicle is coasting on a non-transitory memory of the vehicle.

8. The method of claim 7, further comprising determining whether the data points of the graph are still in a dead zone.

9. The method of claim 8, wherein finding the bend point of the curve in the graph to determine the optimum trailer brake gain occurs in response to determining that the data points are not in the dead zone.

10. The method of claim 1, wherein the vehicle includes a brake pedal and an acceleration pedal, and the vehicle is coasting when: 1) the vehicle is driven at predetermined speed range; 2) the vehicle is driven straight; 3) the brake pedal is not depressed; and 4) the acceleration pedal is not depressed.

11. A vehicle system, comprising:
a vehicle;
a trailer attached to the vehicle, wherein the trailer includes a trailer brake;
a trailer brake controller programmed to command the trailer brake to apply brake pulses;
wherein the trailer brake controller is programmed to:
command the trailer brake to apply trailer brake pulses to the trailer while the vehicle is coasting, wherein each of the trailer brake pulses has an activation brake time and a trailer brake gain, and the trailer brake gain is proportional to an amount of braking force applied to the trailer by the trailer brake;
monitor an average deceleration of the vehicle and the trailer brake gain of the trailer brake pulses applied to the trailer while the vehicle is coasting;
generate a graph of the average deceleration of the vehicle versus the trailer brake gain, wherein the graph includes a curve that illustrates a relationship between the average deceleration of the vehicle and the trailer brake gain of the trailer brake pulses applied to the trailer while the vehicle is coasting; and
find a bend point of the curve in the graph to determine an optimum trailer brake gain.

12. The vehicle system of claim 11, wherein the curve includes curve segments between two adjacent data points, and the controller is programmed to finding the bend point of the curve by:
determining a slope of each of the curve segments of the curve in the graph; and
wherein the bend point is one of the curve segments in which the slope is less a predetermined threshold.

13. The vehicle system of claim 12, wherein the controller is programmed to increase the trailer brake gain over time.

14. The vehicle system of claim 13, wherein the controller is further programmed to determine an averaging window for determining the average deceleration of the vehicle.

15. The vehicle system of claim 14, wherein the controller is further programmed to calculate the average deceleration of the vehicle in the averaging window.

16. The vehicle system of claim 15, wherein the controller is further programmed to store the average deceleration of the vehicle and the trailer brake gain of the trailer brake pulses applied to the trailer while the vehicle is coasting on a non-transitory memory of the vehicle.

17. The vehicle system of claim 16, wherein the controller is further programmed to determine whether the data points of the graph are still in a dead zone.

18. The vehicle system of claim 17, wherein the controller is programmed to find the bend point of the curve in the graph to determine the optimum trailer brake gain in response to determining that the data points are not in the dead zone.

19. The vehicle system of claim 11, wherein the controller is further programmed to determine a step size of the trailer brake pulses.

20. The vehicle system of claim 11, wherein the vehicle includes a brake pedal and an acceleration pedal, and the vehicle is coasting when: 1) the vehicle is driven at predetermined speed range; 2) the vehicle is driven straight; 3) the brake pedal is not depressed; and 4) the acceleration pedal is not depressed.

* * * * *